(12) United States Patent
Douceur et al.

(10) Patent No.: US 10,698,877 B2
(45) Date of Patent: Jun. 30, 2020

(54) HIGH-PERFORMANCE NAMING SERVICE USING AN OPTIMISTIC-CONCURRENCY-CONTROL IN-MEMORY DATABASE

(71) Applicant: Microsoft Technology Licensing, LLC, Redmond, WA (US)

(72) Inventors: John Russell Douceur, Bellevue, WA (US); Vinit Ogale, Redmond, WA (US); Joseph Peter Raisanen, Seattle, WA (US); Scott Andrew Marks, Bothell, WA (US); Balaji Krishnamachari-Sampath, Sammamish, WA (US); Premika Mani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 15/593,999

(22) Filed: May 12, 2017

(65) Prior Publication Data

US 2018/0329937 A1    Nov. 15, 2018

(51) Int. Cl.
*G06F 16/23*    (2019.01)
*G06F 16/22*    (2019.01)
*G06F 16/16*    (2019.01)

(52) U.S. Cl.
CPC .......... *G06F 16/2322* (2019.01); *G06F 16/16* (2019.01); *G06F 16/2282* (2019.01); *G06F 16/2365* (2019.01); *G06F 16/2379* (2019.01)

(58) Field of Classification Search
CPC .................................................. G06F 16/2282

USPC .................................................. 707/791, 796
See application file for complete search history.

(56) References Cited

U.S. PATENT DOCUMENTS

| 8,386,421 | B2 | 2/2013 | Reid et al. |
| 8,396,831 | B2 | 3/2013 | Larson et al. |
| 8,510,344 | B1 * | 8/2013 | Briggs ............... G06F 16/2322 707/802 |
| 2010/0005113 | A1 | 1/2010 | Hu et al. |
| 2011/0302143 | A1 | 12/2011 | Lomet |

(Continued)

OTHER PUBLICATIONS

Larson, et al., "High-Performance Concurrency Control Mechanisms for Main-Memory Databases", In Proceedings of 38th International Conference on Very Large Data Base Endowment, vol. 5, No. 4, Aug. 27, 2012, pp. 298-309.

(Continued)

*Primary Examiner* — Baoquoc N To
(74) *Attorney, Agent, or Firm* — Holzer Patel Drennan

(57) ABSTRACT

Implementing a naming service for a hierarchal namespace in a database format. A method includes at a database, wherein the database stores a first table having references to hierarchical nodes in a hierarchical namespace, and a second table with relational references to hierarchical nodes referenced in the first table, detecting an edge modification event changing one or more edges of a node in the hierarchical namespace. The method further includes, as a result, creating a unique row in the second table for the edge modification event in the hierarchical namespace. Any edge modification event results in creation of a unique row in the second table such that different entities can cause overlapping edge modification events that can be documented at the database without transactional conflicts.

21 Claims, 6 Drawing Sheets

(56) References Cited

U.S. PATENT DOCUMENTS

| | | |
|---|---|---|
| 2014/0067791 A1 | 3/2014 | Idicula et al. |
| 2015/0341167 A1* | 11/2015 | Gregory ............... H04L 9/0822 380/281 |
| 2016/0147814 A1 | 5/2016 | Goel et al. |
| 2016/0308982 A1 | 10/2016 | Greene |

OTHER PUBLICATIONS

Dalessandro, et al., "Strong Isolation is a Weak Idea", In Proceedings of 4th Workshop on Transactional Computing, Feb. 10, 2009, pp. 1-9.

"DNS Architecture", https://technet.microsoft.com/en-in/library/dd197427(v=ws.10).aspx, Retrieved on: Apr. 3, 2017, 11 pages.

Bernstein, et al., "Optimizing Optimistic Concurrency Control for Tree-Structured, Log-Structured Databases", In Proceedings of ACM SIGMOD International Conference on Management of Data, May 31, 2015, pp. 1295-1309.

\* cited by examiner

HIGH-PERFORMANCE NAMING SERVICE USING AN OPTIMISTIC-CONCURRENCY-CONTROL IN-MEMORY DATABASE

BACKGROUND

Background and Relevant Art

Computers and computing systems have affected nearly every aspect of modern living. Computers are generally involved in work, recreation, healthcare, transportation, entertainment, household management, etc.

Computing data is often stored as files in a files system. File systems are typically organized hierarchically. For example, one can imagine a file system with a root namespace. Within the root namespace could be files and/or folders. Within the folders could be files, or still other folders. And so forth. A namespace can be used to identify the 'path' from the root to a desired file or folder.

In big data environments, such as distributed file systems, it may be useful to store large amounts of data distributed across multiple systems. The data can still be accessed by following a hierarchical path to the data.

A core component of a distributed file system is a name service. The job of the name service is to map hierarchical paths (e.g., /foo/bar) to flat identifiers that refer to locations where the file's data is stored. The name service exports read commands that interrogate the state of the namespace and write commands that modify the state of the namespace. A typical read command is Get, which returns the identifier associated with a given path, along with possibly other information associated with the path. Paths are said to be related to each other when they have common prefixes. For example, /foo is a parent of /foo/bar, and /foo/bar is a child of /foo. A typical read command that exploits these relationships is Enumerate, which returns the child paths of a given path. Typical write commands include Bind, which adds a new path to the namespace and associates it with a given identifier, and Unbind, which removes an extant path from the namespace.

Name services typically store their data in memory and/or on disk, using data structures that align with the needs of the name service. For instance, tree data structures are commonly used to store the paths in the namespace, where each node in the tree corresponds to a path. Such data structures can work well when the name service is not required to provide high availability and high performance. However, if high availability is required, this is typically achieved via replicating the service on multiple machines, which requires a mechanism to ensure consistency of the replicas. If high performance is also required, this necessitates that the consistency mechanism be extremely fast. While there are fast mechanisms that exist, such as certain fast database systems, these mechanisms may be less suitable for name services for hierarchical structures as they have a different structure, and when "shoehorned" into the hierarchical structure, undesirable results may occur such as transactional conflicts and/or duplication of large swaths of information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of implementing a naming service for a hierarchal namespace in a database format. The method includes at a database, wherein the database stores a first table having references to hierarchical nodes in a hierarchical namespace, and a second table with relational references to hierarchical nodes referenced in the first table, detecting an edge modification event changing one or more edges of a node in the hierarchical namespace. The method further includes, as a result, creating a unique row in the second table for the edge modification event in the hierarchical namespace. Any edge modification event results in creation of a unique row in the second table such that different entities can cause overlapping edge modification events that can be documented at the database without transactional conflicts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

A naming service maps hierarchical paths (e.g., /foo/bar) to flat identifiers that refer to locations where the file's data is stored. Name services typically store their data in memory and/or on disk, using data structures that align with the needs of the name service (e.g., tree data structures). However, some embodiments illustrated herein implement a naming service built on a high-availability/high-performance replication system that provides an in-memory database.

To achieve high performance with the rich, hierarchical semantics required of a naming service, an in-memory database with ACID transactions is used. However, the high performance of memory access can be severely compromised by using pessimistic (lock-based) concurrency control. Optimistic concurrency control mechanisms can exploit the high performance of memory, but naïve application to complex representational problems can result in high probabilities of transactional conflicts, which again compromises performance. Embodiments illustrated herein may use carefully denormalized data representations and judicious use of relaxed isolation to avoid transactional conflicts without compromising the strong consistency guarantees of the naming-service semantics.

Figure 1:
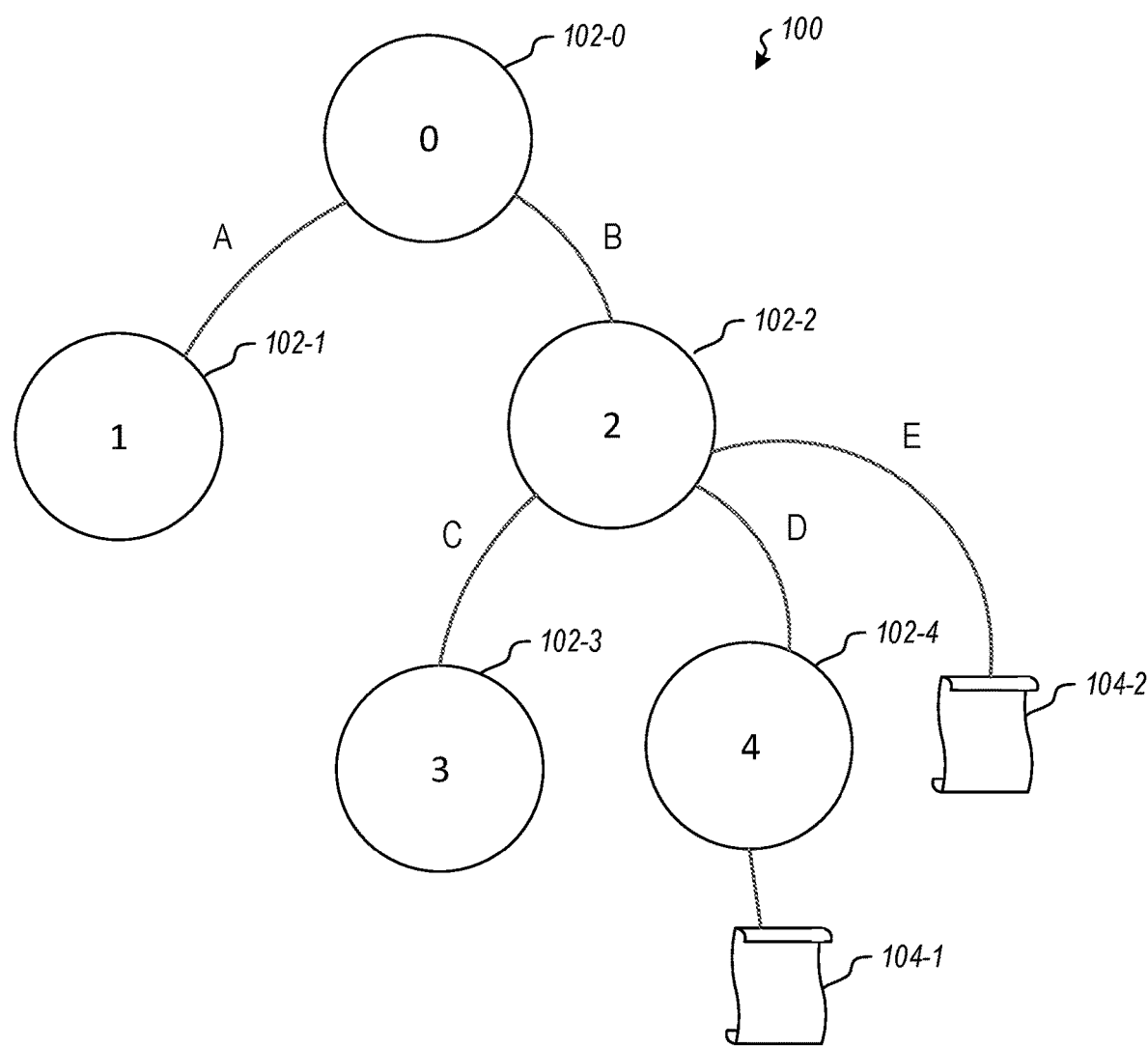
FIG. 1 illustrates a hierarchical structure and a naming service for the hierarchical structure implemented using a database.

An example is illustrated now in FIG. 1. FIG. 1 illustrates a hierarchical structure 100. The hierarchical structure 100 may be, for example, a namespace for a file system. The hierarchical structure 100 includes a root node 102-0. For example, the root node may be the root of a namespace for a file system. The hierarchical structure 100 further includes a plurality of other nodes including nodes 102-1 through 102-4 as illustrated. Nodes, referred to generally as 102, may represent folders or other containers. Additionally, each of the nodes 102 is connected to one or more other nodes by one or more named edges (named A, B, C, D, and E in the illustrated example) as illustrated.

FIG. 1 further illustrates targets 104-1 and 104-2. A target, as used herein, is an external identifier tied to a node. For example, the targets, referred to generally herein as 104, may be file identifiers in a file system.

Paths may be identified by reference to nodes. For example, /B/C may be the path from node 0 102-0, to node 2 102-2, to node 3 102-3. Note that different nodes may have the same name so long as they are not at the same hierarchical level. However, for clarity in the present example, unique node names are used.

Some embodiments illustrated herein may implement a naming service in a database 150. However, the database 150 may be a specialized multi-version concurrency control (MVCC) database. MVCC allows for multiple entities to access data in the database by maintaining several different versions of data in using time stamps to protect against conflicting accesses. Using a MVCC database allows for a high availability, high-performance naming service to be implemented.

One such database is the Hekaton in-memory database available from Microsoft Corporation of Redmond Wash. Hekaton is a high-availability/high-performance replication system that provides an in-memory database with multi-version concurrency control (MVCC) for data storage and access. Hekaton offers a platform that can be used to construct a high-availability/high-performance name service.

When using a database for a namespace service, namespace data is stored in database tables instead of data structures that more naturally mirror the arrangement of a name service, such as trees. Thus, specialized mapping is performed to map namespace nodes to database representations. Furthermore, to effectively use MVCC, factors are taken into account related to minimizing transactional conflicts when performing namespace commands, which impacts both the schema of the tables and the logic by which the tables are accessed and modified.

As noted, embodiments implement a name service built atop a MVCC database. Embodiments use a set of tables to store namespace information. This information can loosely be partitioned into the following categories:

Fixed-sized information about a node in the namespace.
Information about the relationship between two nodes
Non-fixed-sized information about a node that is specific to that node.
Non-fixed-sized information about a node that may be shared with other nodes.
Information about a node that is stored specially to reduce transactional conflicts.
Information not specifically related to the namespace.

Not all information, however, is stored in all embodiments in its most straightforward normalized representation. For example, some MVCC systems may have their performance drastically compromised by transactional conflicts that can arise when data is fully normalized. For example, POSIX-Compliance requires recording the time at which a folder's contents were last modified. Two concurrent changes to the folder's contents will both try to modify the last-modified time and will transactionaly conflict if this requires modifying the same row in a table. So, as illustrated below, last-modified time is stored de-normalized in a table that is appended by each update, and a run-behind thread (illustrated later herein by the aggregation daemon 278 shown in FIG. 2) aggregates this information in the background. This table is indexed by row-insertion time, so an efficient lookup can determine the most up-to-date value.

The following now illustrates how data might be stored in some embodiments.

As noted above, fixed-size information about a node is stored. The information may be stored in a table referred to herein as a NodeTable, with one row per node. The following illustrates example fields that may be included in some embodiments of a NodeTable.

| NodeTable - each row contains information about a single node in the namespace | | |
|---|---|---|
| fields: | NodeId | a unique identifier for the node |
| | OwnerUser | the identifier of the user that owns the node |
| | OwnerGroup | the identifier of a group associated with the node |
| | AclId | the identifier of an ACL for the node |
| | Target | the external identifier that is bound to the node |
| | CreationTime | the time at which the node was originally created |

The information embodiments store about the relationship between two nodes is the parent-child relationship, which is called an "edge". This information is stored in a table referred to herein as an EdgeTable, with one row per edge. For every node in the namespace other than the root node, there is exactly one row in this table for which the node is indicated as a child. Every node can appear multiple times, or not at all, as a parent.

| EdgeTable - each row represents the parent-child relationship between two nodes | | |
|---|---|---|
| fields: | ParentId | identifier for the parent node |
| | ChildId | identifier for the child node |
| | Label | the label of the edge connecting the parent to the child |

Some embodiments can associate arbitrary tag/value metadata with a node. A tag is typically a string and a value is also typically a string. A node can have zero or more associated tag/value pairs, up to a configurable limit. This information is stored in a table referred to herein as the TagValueTable.

| TagValueTable - each row represents a tag/value metadata pair associated with a node | | |
|---|---|---|
| fields: | NodeId | identifier for the node |
| | Tag | a string for the given tag |
| | Value | a string for the given value |

Some embodiments implement Posix-style Access Control Lists (ACLs), which are stored in a table referred to herein as an AclTable. Logically, each node has its own ACL; however, it is common for many nodes in a namespace to have identical ACLs. Therefore, instead of using node ID as an index into the AclTable, some embodiments use an ACL ID, which is stored in the Node Row. Multiple nodes may have the same ACL ID and thus share the corresponding rows in the AclTable. As will be illustrated below, in some embodiments, the ACL ID may be hash of access control rules in an ACL.

| AclTable - each row represents an Access Control Entry for one or more nodes | | |
|---|---|---|
| fields: | AclId | an identifier that ties together a set of ACEs into an ACL |
| | Scope | the identifier of the user that owns the node |
| | Type | the identifier of a group associated with the node |
| | Identity | the identifier of the ACL for the node |
| | Permission | the time at which the node was originally created |

One special bit of information about a node is the time at which its children have most recently been modified. In theory, this could be stored in a NodeRow in the NodeTable, just as the node's CreationTime is stored. However, this information is frequently updated as children are added to, removed from, and renamed in the namespace. Storing the children modification time in the NodeRow has been shown to lead to a high rate of transactional conflicts, which drastically harms performance. So, instead, some embodiments use a special table for this information, illustrated herein as a ChildrenModificationTable. Whenever a child of a node is modified, a new row is added to this table. A background thread aggregates this information, to prevent the table from growing excessively large.

| ChildrenModificationTable - each row contains information about a modification event | | |
|---|---|---|
| fields: | ModificationId | a unique identifier for the modification entry |
| | NodeId | identifier for the node |
| | Timestamp | the time of the children modification |
| | ChildrenCountChange | the change to the count of children caused by this modification |
| | RowInsertionTime | the time at which the modification row was added to the database |

Another table illustrated herein does not relate to the namespace itself, but is used to avoid inconsistencies that might otherwise arise due to retries. If a machine goes down in the middle of executing a command, other parts of the system cause the command to be retried. If the failure occurred before the command made any changes to the database, this retry can proceed as a normal command execution. However, if the machine already modified the database, it is important for the retried command to return the same result to the command submitter as the original execution of the command would have returned.

To support this, some embodiments maintain a table of successful write commands, indexed by an ID that is unique to the command. When a server receives a write command, it looks in this table, and if the command ID is present, it returns a success code to the caller instead of executing the command, because it knows that the command was already executed successfully. Some embodiments do not track read commands in this way, because they do not modify the namespace. Some embodiments also do not track write commands that failed due to a semantic error, because these also do not modify the namespace. Some embodiments implement semantics are such that the namespace is modified only if a success code is returned.

| SuccessfulWriteCommandTable - each row represents a write command that has succeeded | | |
|---|---|---|
| fields: | CommandId | a unique identifier for the command |
| | ExpirationTime | the time at which the command is set to expire |

Embodiments may implement file management that includes a scalable, strongly consistent, highly-available, high-performance, hierarchical naming service (e.g., naming service 125 illustrated in FIG. 2) that maps mutable hierarchical paths to fixed references to objects in other metadata services. The naming service may support full hierarchical naming semantics, including renaming elements of paths, moving subtrees within the namespace, and paged enumeration of folders. The naming service may also support POSIX-style access control with both classic permissions (owner, group, other) and extended ACLs (access and default).

In some embodiments, the naming service includes of a bank of soft-state front-end proxies 126 and a set of servers 128. The proxies 128 route commands to servers, coordinate execution of multi-server commands (e.g. move), and respond to changes in namespace partitioning. The server layer persistently stores namespace state, executes commands, partitions the namespace among the set of servers 128, reparations the namespace as needed, and informs proxies 126 of changes in namespace partitioning.

The naming service 125 may be configured to provide strong consistency in its external semantics both because this is what users and application expect from a file system and also because strong consistency is often needed to maintain namespace integrity. For instance, if two concurrent Move operations use snapshot isolation for their reads, the result can be an orphaned loop in the namespace. Therefore, some embodiments may implement a default policy which is that all write operations use serializable isolation and all read operations use snapshot isolation. However, because serializable isolation can lead to a high rate of transactional conflicts, embodiments can carefully reduce the isolation level when this can be done without compromising external semantics or namespace integrity. Examples are illustrated below.

For scalability, the namespace can be partitioned among multiple database rings, with each ring having "custody": over one or more regions of the namespace. A custody region is specified as a path terminating in a half-open interval of names, avoiding a hard limit on folder size. For example, the region /hello/world/[bar,foo) includes the paths /hello/world/bar, /hello/world/cat, and /hello/world, doggie/ dig/bone/ but not /hello/world/foo. In some embodiments, each server records its own custody ranges and those it has relocated to other server rings.

In some embodiments, each proxy maintains a non-authoritative cache of server custody ranges. Because this cache can be incomplete or stale, a proxy might forward a command to an inappropriate server, in which case the server will respond with an internal error code and any relevant custody information. The proxy then updates its cache and retries the request.

Figure 2:
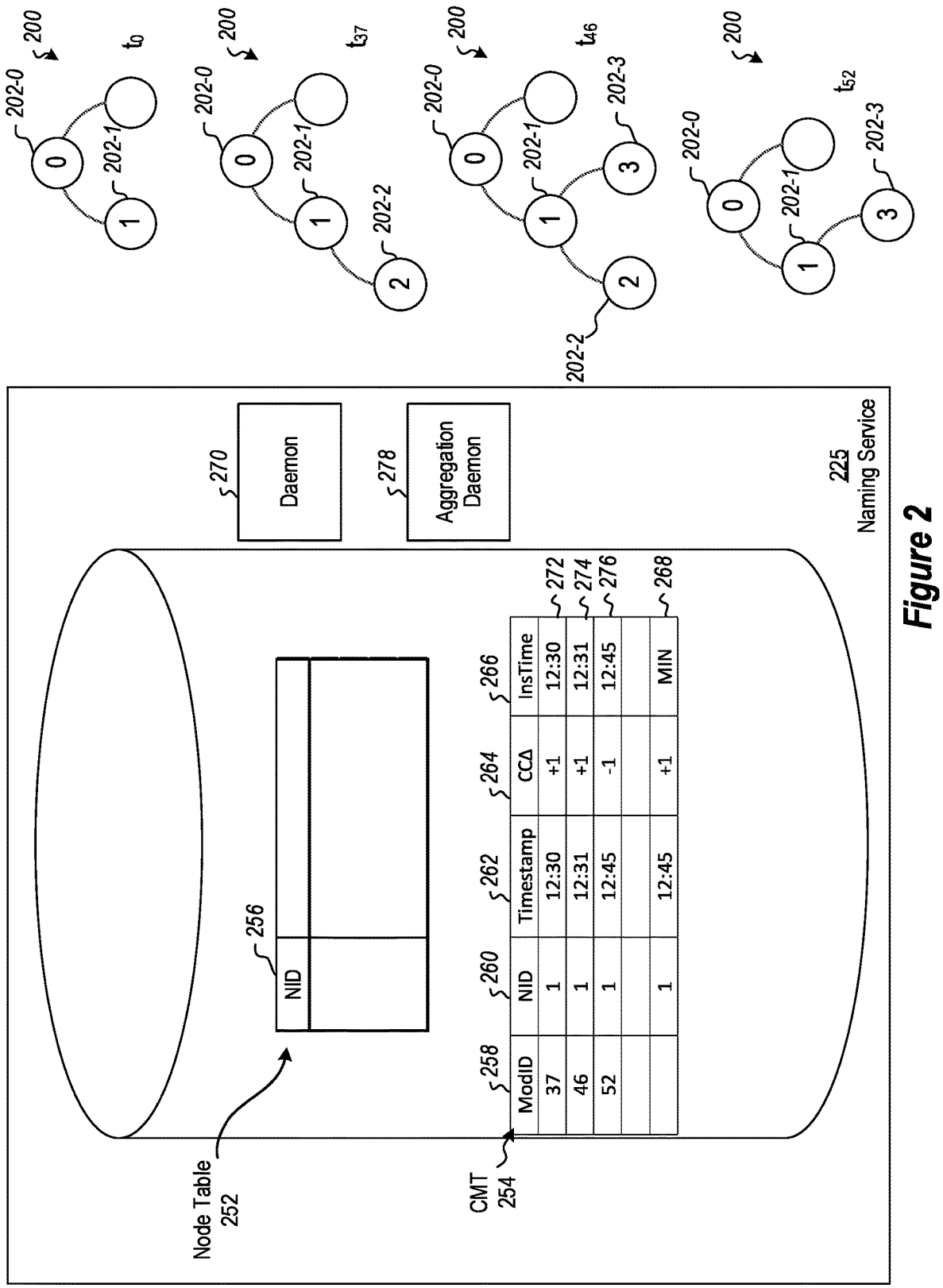
FIG. 2 illustrates a hierarchical structure and elements of a naming service implemented using a database for documenting changes to children of nodes in the hierarchical structure.

Referring now to FIG. 2, a more detailed example is illustrated showing how changes to child nodes in a namespace can be handled in some embodiments of a name service. The name service 225, in the illustrated example, is implemented using an MVCC database 250. For this example, a simplified version of the NodeTable 252 and a simplified version of a ChildrenModificationTable 254 are illustrated.

In the illustrated example, the NodeTable 252 includes a NodeId column 256, which includes rows, each row having a unique node identifier for a node.

The ChildrenModificationTable 254 includes a ModificationID column 258 where each row includes a unique identifier for a modification row.

The ChildrenModificationTable 254 includes a NodeId column 260 where each row includes an node identifier for the node.

The ChildrenModificationTable 254 includes a Timestamp column 262 where each row includes a time of the children modification.

The ChildrenModificationTable 254 includes a ChildrenCountChange column 264 where each row includes a change to the count of children caused by a modification correlated to the row. For example, in some embodiments, this may be a delta showing a +1 (or some other number if net more than one child is added) when a child is added (i.e., bound), a −1 (or some other number if net more than one child is removed) when a child is removed (i.e., unbound), or a 0 when some other change is made to a child of the node, such as renaming it.

The ChildrenModificationTable 254 includes a RowInsertionTime column 266 where each row includes a time at which the modification row was added to the database.

The ChildrenModificationTable 254 includes one or more aggregation rows, such as the aggregation row 268 which can be used to aggregate other rows in the ChildrenModificationTable 254.

Details are now illustrated. FIG. 2 illustrates several examples of a hierarchical structure 200 at different times. At time T0, the hierarchical structure 200 includes the root node 202-0, a node 202-1, and one or more other nodes that are not enumerated for purposes of this example.

At time T37 as illustrated in FIG. 2, a new node 202-2 is added as an added as a child node to the node 202-1. A children modification table row insertion daemon 270 identifies the addition of the new node 202-2 as a child to the node 202-1 and creates a new database row 272 in the ChildrenModificationTable 254. The database row 272 includes a ModificationID value of 37, a NodeId value of 1, identifying the node 202-1, a Timestamp value of 12:30 identifying when the operation to add the node 202-2 as a child node to 202-1 was performed, a ChildrenCountChange entry of +1 indicating a net change of +1 children to the node 202-1, and a RowInsertionTime value of 1230 indicating that time at which the modification row 272 was added to the database 250.

At a later time T46, yet another child node 202-3 is added as a child to the node 202-1 in the hierarchical structure 200. The children modification table row insertion daemon 270 again adds another row 274 to the ChildrenModificationTable 254. The row 274 includes a ModificationID value of 46, the NodeId value of one identifying the node 202-1, eight Timestamp value of 1231 identifying that the addition of the child node 202-3 occurred at 1231, the ChildrenCountChange of value of +1 indicating a net addition of one child node to the node 202-1, and a RowInsertionTime value of 1231 indicating when the row 274 was added to the ChildrenModificationTable 254.

At a later time T52, the child node 202-2 is removed as a child of the node 202-1 from the hierarchical structure 200. The children modification table row insertion daemon 270 detects this change in generates a row 276 for the ChildrenModificationTable 254. The row 276 includes a ModificationID value of 52, a NodeId value of one, the Timestamp of value of 1245, the children count change value of −1 indicating the removal of net one node as a child of the node 202-1, and a RowInsertionTime value of 1245.

Note that while in the present example only a single node 202-1 is considered it should be appreciated that in other embodiments various additions and removals of children nodes may occur for other nodes in the hierarchical structure 200.

The ChildrenModificationTable 254 is used to prevent potential transactional conflicts that might occur should the same information be stored in the NodeTable 252. In particular, if the NodeTable 252 included a row for a node where the row included various children modification entries, conflicts may occur as different child nodes are added and removed or otherwise changed in an overlapping fashion. By using the ChildrenModificationTable 254 additions, removals, or other changes to children nodes can occur in an overlapping fashion, but each change is captured in its own row of the ChildrenModificationTable 254. In this way, the changes will not conflict with each other as each change is independently documented.

As can be appreciated, documenting each change will result in the ChildrenModificationTable 254 growing with each change. Thus, some embodiments include functionality for consolidating the changes in the ChildrenModificationTable 254.

FIG. 2 illustrates that the database 250 includes an aggregation daemon 278 (which may be included in the servers 128). The aggregation daemon 278 is configured to parse the rows of the ChildrenModificationTable 254 to attempt to identify rows for aggregation. In particular, the aggregation daemon 278 will attempt to identify rows with the same NodeId value and to aggregate those rows in an aggregation row such as aggregation row 268. Note that the aggregation daemon 278 is a single thread entity such that no other entities will be interfering with the aggregation process being performed by the aggregation daemon 278. This will prevent the transactional conflicts that might otherwise occur if multiple threads were attempting to perform aggregation operations simultaneously. The aggregation daemon 278 will read one or more rows for a particular node ID value, use the information stored in the one or more rows and update the aggregation row 268. Once the aggregation row 268 has been updated, the other rows accessed for aggregation can be deleted from the ChildrenModificationTable 254 to prevent unbounded growth of the ChildrenModificationTable 254.

In the illustrated example, the aggregation row 268 includes a NodeId value of 1 representing the node 202-1.

The aggregation row 268 further includes a Timestamp value of 12:45 indicating the latest Timestamp value from the rows 272, 274 and 276. The aggregation row 268 further includes a ChildrenCountChange value of +1, which is an aggregation of the ChildrenCountChange values from the rows 272, 274, and 276. The aggregation row 268 further includes a RowInsertionTime value of 12:45 indicating the latest time from the RowInsertionTime values in the rows 272, 274, and 276. Note that while the example shown in FIG. 2 illustrates that the rows 272, 274, 276, and 268 are existing simultaneously in the ChildrenModificationTable 254, it should be appreciated that the rows 272, 274, and 276 will be removed once and the row 268 has been updated with the values shown in the ChildrenModificationTable 254 illustrated in FIG. 2. Thus, the example shown in FIG. 2 is simply shown for clarity and does not represent the actual state of the table as it might exist at a particular time, except that it might represent the state of the ChildrenModificationTable 254 as it might exist immediately prior to the aggregation row 268 being updated and the other rows 272, 274 and 276 being removed from the ChildrenModificationTable 254.

Figure 3:
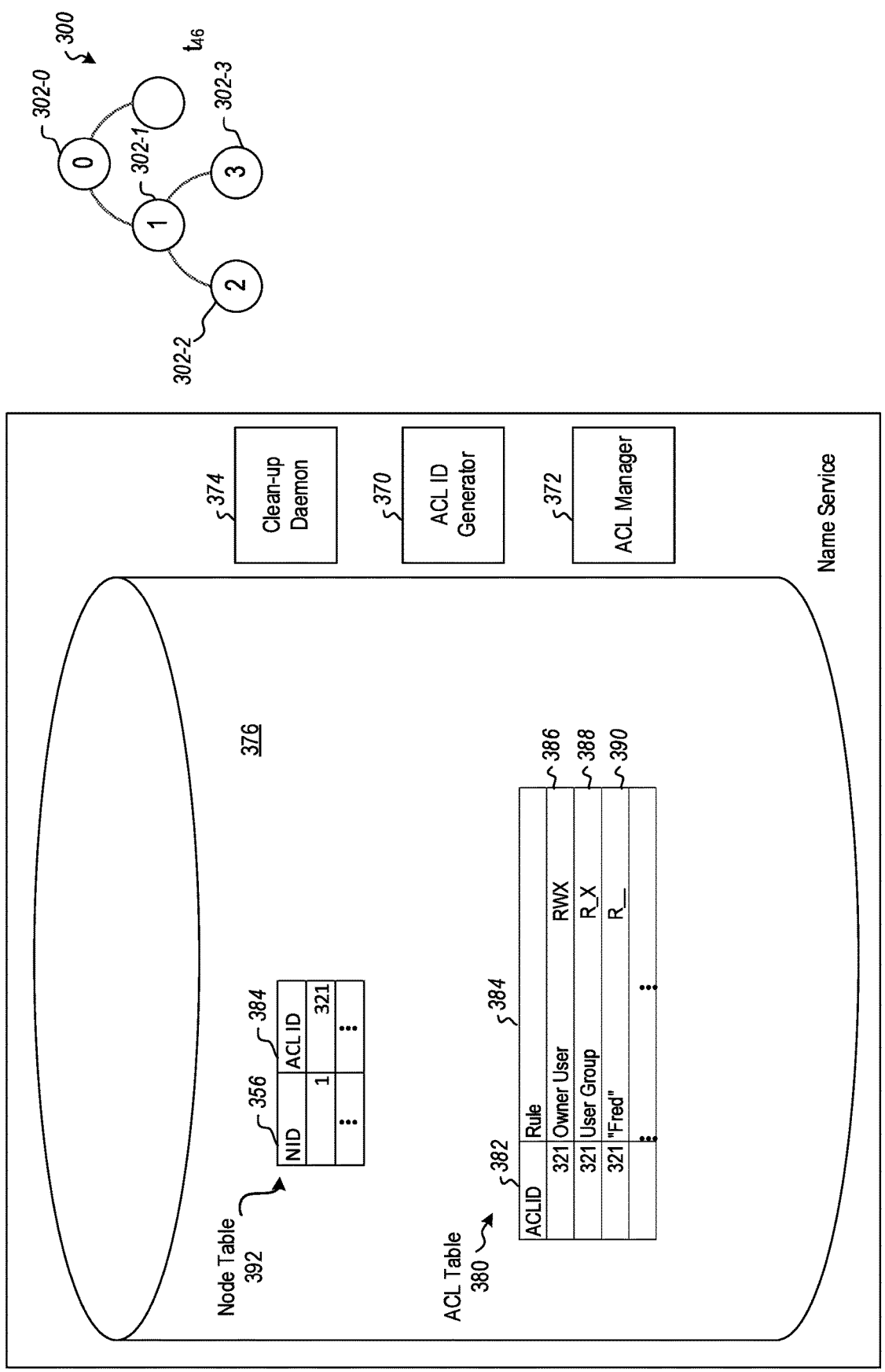
FIG. 3 illustrates a hierarchical structure and elements of a naming service implemented using a database for managing access control rules for nodes of the hierarchical structure.

Referring now to FIG. 3, an example of access control list (ACL) management is illustrated. Note that ACLs tend to be widely duplicated among namespace entries. As such, as illustrated below, ACLs can be stored in normalized form. That is, ACLs may be stored in auxiliary tables with a level of indirection that allows multiple node entries in a NodeTable to refer to the same set of auxiliary rows in an ACLTable, allowing deduplication of ACLs. Typically, AclTables are orders of magnitude smaller than main entry tables.

FIG. 3 illustrates a database 350. The database includes a NodeTable 352. The database additionally includes in AclTable 380. The NodeTable 352 illustrated in FIG. 3 is an abbreviated example of a NodeTable 352 node table illustrating a NodeId column 356 and ACL ID column 390.

The AclTable 380 is an abbreviated example of an AclTable, and includes an AclID column 382 and a rule column 384. The rule column 384, as illustrated herein in FIG. 3 is an agglomeration of the various fields illustrated above for an AclTable. However, in practice, the rule column 384 will be implemented using a number of different columns as illustrated above.

Illustrating now the functionality for management of ACLs, a hierarchical structure 300 is illustrated. The hierarchical structure includes a root node 302-0, a node 302-1 descendant from the root node 302-0, and two children nodes of the node 302-1, namely nodes 302-2 and nodes 302-3.

For purposes of the example illustrated and FIG. 3, attention is focused on the NodeId 302-1 and associated access control rules in an access control list (ACL). As noted previously, the NodeTable 352 includes a NodeId column 356 and AclID column 390. In this way, the particular node can be correlated with ACLs for the node in a deduplicated fashion. In particular, a node identifier is correlated with an ACL identifier.

Note that an ACL may consist of a number of different rules. This is illustrated in FIG. 3 where an ACL identifier is correlated with different rules in different rows, e.g. rows 386, 388, and 390, of the AclTable 380. Thus in the example illustrated in FIG. 3, an ACL identifier 321 is correlated with a rule applicable to an owner user that allows the owner user to read data at the node 302-1, write data at the node 302-1, and traverse the node 302-1 to access children of the node 302-1. The AclTable 380 further includes a row 388 which correlate the ACL identifier 321 with an owner group rule that allows users in this group to read data at the node 302-1 and traverse the node 302-1 to access children nodes of the node 302-1. However, write privileges are restricted by the rule enumerated in row 388. FIG. 3 further illustrates that the AclTable 380 includes a row 390 which correlates the ACL identifier 321 with a rule directed to a particular user "Fred". The rule enumerated in a row 390 gives the particular user Fred the ability to read data from the node 302-1 but restricts writing to the node 302-1 and traversing the node 302-1 to access children nodes of the node 302-1.

In some embodiments, a given ACL identifier may be generated by hashing the various rules for an ACL. In particular, the various rules for a given ACL can be identified and a hashing algorithm performed on the rules to create a hash which will be used as the ACL identifier stored in the AclID column 382 and correspondingly in the AclID column 390. Note that typically a good hash algorithm will almost always generate, probabilistically, a unique identifier that is unique from other identifiers for other ACLs computed using hashing algorithms.

However, there is some very remote possibility that the same hash could be generated for different ACLs. Thus, some embodiments implement functionality for identifying when a hash is computed for an ACL that is identical to another hash previously computed for a different ACL. In this case, a unique identifier will be generated for the new ACL so as to create an identifier that is different from other identifiers. Note however, large amounts of testing have not produced such a situation where a non-unique hash was computed and thus the probability of such occurring is very small. Nonetheless, some embodiments include contingencies for just such occurrences. When a unique identifier is created, it can be distinguished in some way from a hash based identifier. In some embodiments this may be done by setting or clearing the first bit (or some other bit) of the ACL identifier. Thus for example, if an ACL identifier begins with a '0', then the ACL identifier was created by computing a hash of the rules for the ACL. However, if the ACL identifier begins with a '1', then the ACL identifier is a unique identifier created to distinguish the unique identifier from a previously computed hash for a different ACL.

Thus, FIG. 3 illustrates an ACL identifier generator 370. The ACL identifier generator 370 is employed when a new node containing an ACL is added to the namespace or when the ACL associated with a node is modified. The ACL identifier generator 370 is provided with the rules for the new ACL, and the ACL identifier generator 370 performs a hashing computation on the rules to create an ACL identifier for the ACL. When the ACL associated with a node is modified, the old ACL is no longer referenced by the node, and a new ACL is added to represent the modified ACL.

Additionally, the ACL identifier generator 370 includes functionality to compare ACL identifiers computed using a hashing algorithm with already existing ACL identifiers in the AclID column 382. The ACL identifier generator 370 can identify when different ACLs share the same computed ACL identifier. In such cases, the ACL identifier generator is configured to assign a globally unique identifier (GUID) 21 of the ACLs to prevent conflict.

Note that embodiments may be implemented where ACLs are deduplicated. That is, one ACL may be referred to by multiple namespace entries in the NodeTable 352, such that the ACL can be represented a single time in the AclTable 380 and referred to many times by rows in the NodeTable 352.

When an entry is deleted from the NodeTable 352, its associated ACL rows should be removed from the AclTable 380 only if no other entries refer to the ACL. User reference counting for this would require a serializable update on every create and delete, which could cause a high rate of transitional conflicts for popular ACLs. So, instead, some embodiments have an index 376 on the AclID column 390 in the NodeTable table 352, and at the time of deletion of a row in the NodeTable 352, an ACL manager 372 will check the index 376 to determine whether at least two entries in the AclID column 390 refer to the ACL identifier referenced in the removed row. If two entries in the AclID column 390 refer to an ACL identifier in the removed row, then the corresponding rows defining the ACL rules are not removed from the AclTable 380. If only a single reference for the ACL identifier exists in the index 376, then it is the one being removed, and corresponding rows defining ACL rules in the AclTable 308 can be removed.

This, without additional considerations, can work for many situations. However, if a new node with this same ACL is concurrently inserted into the table, this insertion will transactionally conflict with the check of whether there is more than one matching entry in the table. For highly popular ACLs, this has been observed to happen quite frequently, leading to an unacceptable rate of transitional conflicts. To minimize such conflicts, this check is performed in some embodiments optimistically using snapshot isolation and then confirmed using serializable isolation.

In particular, to perform a snapshot isolation check, just prior to the check being performed, a snapshot of at least the AclID column 390 and/or the index 376 is taken, and the check is performed on the snapshot by the ACL manager 372. A serializable isolation check is then made, if the snapshot check succeeds, to confirm that there are still no other nodes referring to this ACL.

It is very common for the first check to fail, allowing the ACL manager to avoid a serializable check. This is semantically safe because the ACL manager will remove the ACL only if it can serializably confirm that it is not needed. However, when the snapshot check fails, embodiments may fail to remove an ACL for which there is no reference in the NodeTable 352. This represents a resource leak. However, a background process, illustrated herein as the clean-up daemon 374 cleans up these unreferenced ACLs. The clean-up daemon 374 scans through the ACL table and, for each entry, performs the same check described above to determine whether the ACL is in use by any node row. For the same reasons as above, it is possible for the clean-up daemon 374 to, on any given pass, fail to remove an ACL for which there is no reference in the NodeTable 352. However, it is highly likely that after multiple passes through the ACL table, nearly all unreferenced ACLs will be removed.

Thus, embodiments can implement a hierarchical naming service on a multi-version concurrency-control database in a way that achieves high throughput and low latency. As illustrated above, this can be done where data is stored in a denormalized fashion to avoid transactional conflicts from concurrent threads. In some embodiments, only part of the denormalized representation is read to determine a condition for the purpose of minimizing transactional conflicts. Additionally or alternatively, in some embodiments, the denormalized representation is compacted by a process that avoids reading portions of the data structure that are still subject to updates, thereby avoiding read/write transactional conflicts. Additionally or alternatively, in some embodiments, weak transactional isolation levels are used to tentatively assess a condition before validating the assessment using a stronger isolation level, to minimize transactional conflicts.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
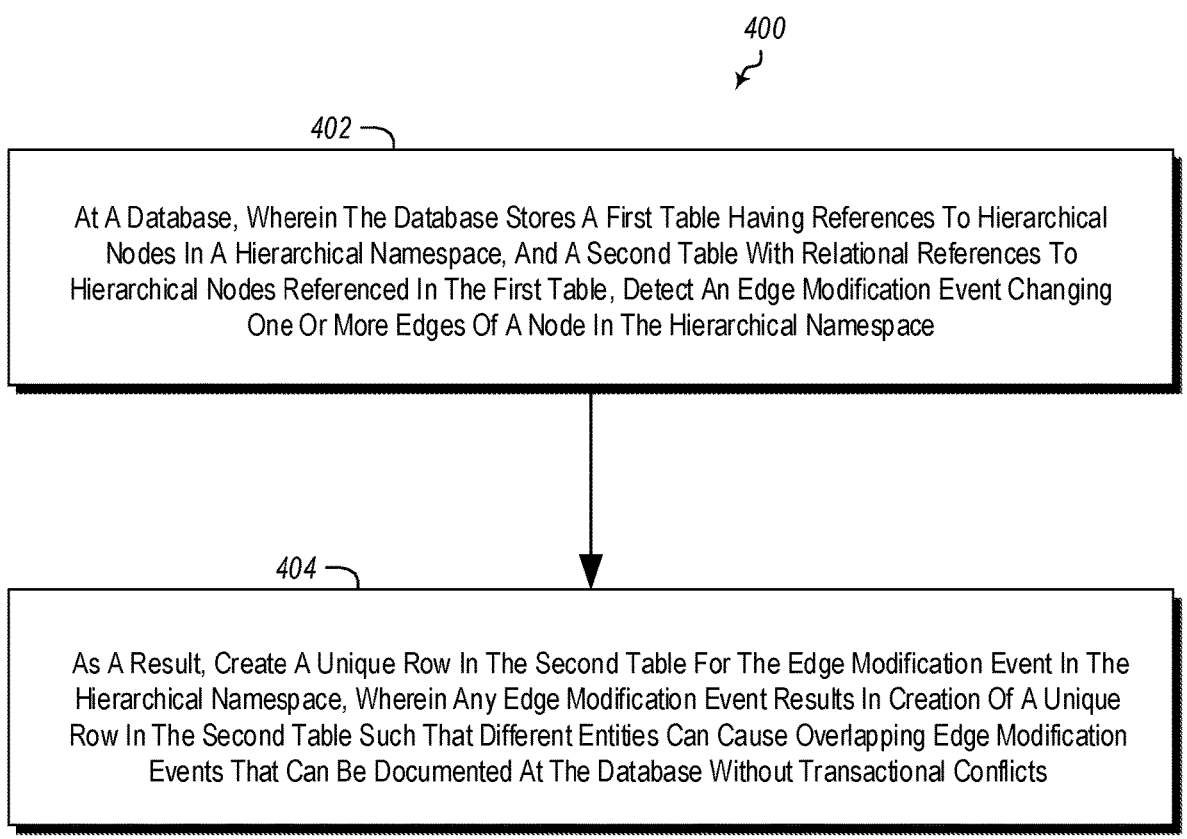
FIG. 4 illustrates a method of implementing a naming service for a hierarchical name space in a database format.

Referring now to FIG. 4, a method 400 is illustrated.

The method 400 includes acts for implementing a naming service for a hierarchal namespace in a database format.

The method 400 includes at a database, wherein the database stores a first table having references to hierarchical nodes in a hierarchical namespace, and a second table with relational references to hierarchical nodes referenced in the first table, detecting an edge modification event changing one or more edges of a node in the hierarchical namespace (act 402). For example, in FIG. 2, the daemon 270 may detect a change to one of the children of the nodes in the hierarchical structure 200.

The method 400 further includes, as a result, creating a unique row in the second table for the edge modification event in the hierarchical namespace, wherein any edge modification event results in creation of a unique row in the second table such that different entities can cause overlapping edge modification events that can be documented at the database without transactional conflicts. For example, the daemon 270 may create a row in the ChildrenModificationTable 254 documenting the change.

The method 400 may be practiced where the relational references in the second table comprise information indicating a time (e.g., logical time) when an edge in the hierarchical namespace was modified.

The method 400 may be practiced where the relational references in the second table comprise information indicating a delta for a children count for nodes. For example, FIG. 2 illustrates a ChildrenCountChange column where a delta for a children count can be recorded.

The method 400 may further include a single thread aggregator: modifying an aggregation row to aggregate children count deltas; and removing any rows for which children count deltas were aggregated in the aggregation row. For example, the aggregation daemon 278 may aggregate rows in the ChildrentModificationTable 254 (such as into the aggregation row 268) and remove any aggregated rows.

Alternatively or additionally, the method 400 may further include a single thread aggregator: identifying rows for a node in the second table; and identifying a latest time when an edge corresponding to the node in the hierarchical namespace was modified. Such embodiments of the method 400 may include storing the latest time in an aggregation row. Alternatively or additionally, such embodiments of the method 400 may include storing the latest time in the first table.

Figure 5:
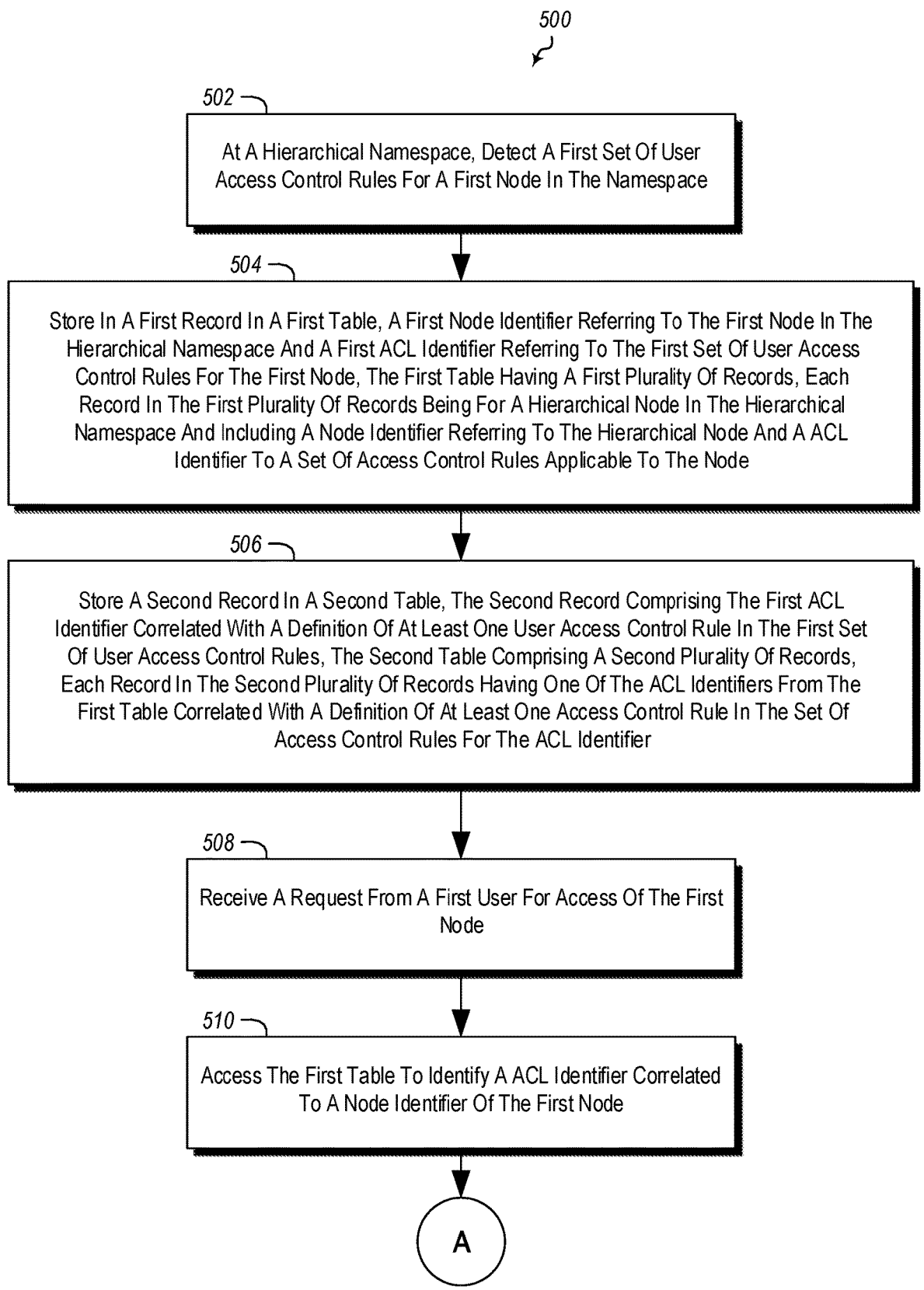
FIG. 5 illustrates a method of controlling access to nodes in a hierarchical namespace.
Figure 5:
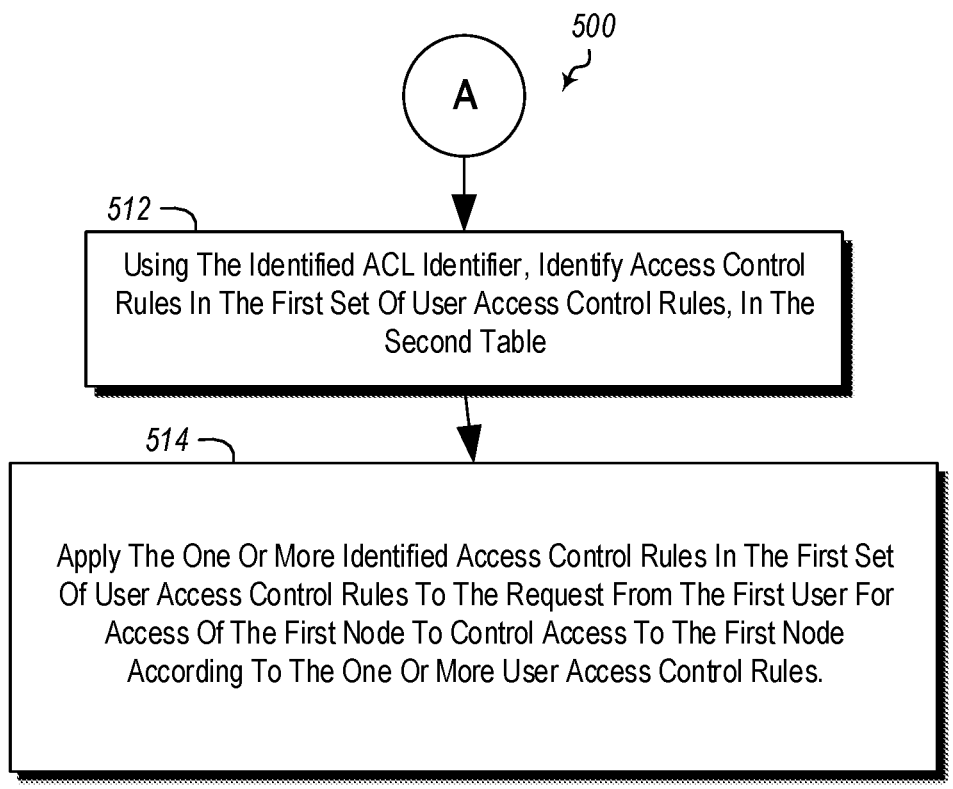

Referring now to FIG. 5, a method 500 is illustrated. The method 500 may include acts for controlling access to nodes (including access to nodes and targets of nodes) in a hierarchical namespace.

The method 500 includes, at a hierarchical namespace, detecting a first set of user access control rules for a first node in the namespace (act 502).

The method 500 further includes storing in a first record in a first table (e.g., the node table 352), a first node identifier referring to the first node in the hierarchical namespace and a first ACL identifier referring to the first set of user access control rules for the first node, the first table having a first plurality of records, each record in the first plurality of records being for a hierarchical node in the hierarchical namespace and including a node identifier referring to the hierarchical node and an ACL identifier to a set of access control rules applicable to the node (act 504).

The method 500 further includes storing a second record in a second table, the second record comprising the first ACL identifier correlated with a definition of at least one user access control rule in the first set of user access control rules, the second table comprising a second plurality of records, each record in the second plurality of records having one of the ACL identifiers from the first table correlated with a definition of at least one access control rule in the set of access control rules for the ACL identifier (act 506).

The method 500 further includes receiving a request from a first user for access of the first node (act 508).

The method 500 further includes accessing the first table to identify an ACL identifier correlated to a node identifier of the first node (act 510)

The method 500 further includes using the identified ACL identifier, identifying access control rules in the first set of user access control rules, in the second table (act 512).

The method 500 further includes applying the one or more identified access control rules in the first set of user access control rules to the request from the first user for access of the first node to control access to the first node according to the one or more user access control rules (act 512).

The method 500 may be practiced where access control rules comprise read, write, and traverse rules. In particular, rules can specify what users can read a node or target of a node, write to a node or target of a node, or traverse (i.e., access child nodes or targets of) a node The method 500 may be practiced where at least one ACL identifier of one record comprises a hash of access control rules in a set of access control rules correlated with the at least one ACL identifier. Thus, as illustrated above, the rules in a set of rules may be hashed to create the ACL identifier.

The method 500 may be practiced where at least one ACL identifier of one record comprises a GUID due to the existence of an already existing identical hash of a different set of access control rules. Thus, if a conflicting hash is computed, a globally unique identifier, that is guaranteed to be unique can be created and used as an ACL identifier instead.

In some such embodiments, at least one ACL identifier is identified as a GUID as opposed to a hash by setting or clearing a bit in the reference. Thus, for example, the first bit in an ACL identifier may identify if the ACL identifier is based on a hash or some other GUID.

The method 500 may further include removing records from the second table for the first set of access control rules when all records in the first table referring to the first set of access control rules are removed from the first table. In some such embodiments, this may further include that all records in the first table referring to the first set of access control rules are removed from the first table by referring to an index indexing ACL identifiers in the first table and determining that less than two entries for the first set of access control rules are in the index.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    one or more processors; and
    one or more computer-readable media having stored thereon instructions that are executable by the one or more processors to configure the computer system to implement a naming service for a hierarchical namespace in a database format, including instructions that are executable to configure the computer system to perform at least the following:
    at a database, wherein the database stores a first table having references to hierarchical nodes in a hierarchical namespace, and a second table with relational references to hierarchical nodes referenced in the first table, detect an edge modification event changing one or more edges of a node in the hierarchical namespace; and
    as a result, create a unique row in the second table for the edge modification event in the hierarchical namespace, wherein each of multiple edge modification events results in creation of a unique row in the second table such that different entities can cause overlapping edge modification events that can be documented at the database without transactional conflicts.

2. The computer system of claim 1, wherein the relational references in the second table comprise information indicating a time when an edge in the hierarchical namespace was modified.

3. The computer system of claim 1, wherein the relational references in the second table comprise information indicating a delta for a children count for nodes.

4. The computer system of claim 1, wherein the one or more computer-readable media further have stored thereon instructions that are executable by the one or more processors to configure the computer system to:
    modify an aggregation row to aggregate children count deltas; and
    remove any rows for which children count deltas were aggregated in the aggregation row.

5. The computer system of claim 1, wherein the one or more computer-readable media further have stored thereon instructions that are executable by the one or more processors to configure the computer system to:
    identify rows for a node in the second table; and
    identify a latest time when an edge corresponding to the node in the hierarchical namespace was modified.

6. The computer system of claim 5, wherein the one or more computer-readable media further have stored thereon instructions that are executable by the one or more processors to configure the computer system to store the latest time in an aggregation row.

7. The computer system of claim 5, wherein the one or more computer-readable media further have stored thereon instructions that are executable by the one or more processors to configure the computer system to store the latest time in time in the first table.

8. A database based naming service for a hierarchical namespace, the naming service comprising:
    a processor;
    a database, wherein the database stores a first table having references to hierarchical nodes in a hierarchical namespace, and a second table with relational references to hierarchical nodes referenced in the first table; and
    a daemon stored in memory and executable by the processor to:
    detect an edge modification event changing one or more edges of a node in the hierarchical namespace; and
    as a result, create a unique row in the second table for the edge modification event in the hierarchical namespace, wherein each of multiple edge modification events results in creation of a unique row in the second table such that different entities can cause overlapping edge modification events that can be documented at the database without transactional conflicts.

9. The naming service of claim 8, wherein the relational references in the second table comprise information indicating a time when an edge in the hierarchical namespace was modified.

10. The naming service of claim 8, wherein the relational references in the second table comprise information indicating a delta for a children count for nodes.

11. The naming service of claim 8, further comprising a single thread aggregator, wherein the single thread aggregator is configured to:
    modify an aggregation row to aggregate children count deltas; and
    remove any rows for which children count deltas were aggregated in the aggregation row.

12. The naming service of claim 8, further comprising a single thread aggregator, wherein the single thread aggregator is configured to:
    identify rows for a node in the second table; and
    identify a latest time when an edge corresponding to the node in the hierarchical namespace was modified.

13. The naming service of claim 12, wherein the single thread aggregator is configured to store the latest time in an aggregation row.

14. The naming service of claim 12, wherein the single thread aggregator is configured to store the latest time in the first table.

15. A method of implementing a naming service for a hierarchical namespace in a database format, the method comprising:

at a database, wherein the database stores a first table having references to hierarchical nodes in a hierarchical namespace, and a second table with relational references to hierarchical nodes referenced in the first table, detecting an edge modification event changing one or more edges of a node in the hierarchical namespace; and as a result, creating a unique row in the second table for the edge modification event in the hierarchical namespace, wherein each of multiple edge modification events results in creation of a unique row in the second table such that different entities can cause overlapping edge modification events that can be documented at the database without transactional conflicts.

16. The method of claim 15, wherein the relational references in the second table comprise information indicating a time when an edge in the hierarchical namespace was modified.

17. The method of claim 15, wherein the relational references in the second table comprise information indicating a delta for a children count for nodes.

18. The method of claim 15, further comprising a single thread aggregator:

modifying an aggregation row to aggregate children count deltas; and removing any rows for which children count deltas were aggregated in the aggregation row.

19. The method of claim 15, further comprising a single thread aggregator:

identifying rows for a node in the second table; and identifying a latest time when an edge corresponding to the node in the hierarchical namespace was modified.

20. The method of claim 19, further comprising storing the latest time in an aggregation row.

21. The method of claim 19, further comprising storing the latest time in the first table.

* * * * *